United States Patent [19]

Haddick

[11] Patent Number: 4,530,011
[45] Date of Patent: Jul. 16, 1985

[54] APPARATUS FOR MAINTAINING OF A CATHODE RAY TUBE IMAGE WITHIN THE LIGHT ACCEPTANCE RANGE OF A PHOTOGRAPHIC FILM

[75] Inventor: David H. Haddick, Berkeley, Calif.

[73] Assignee: LogE/Dunn Instruments, Inc., San Francisco, Calif.

[21] Appl. No.: 444,546

[22] Filed: Nov. 26, 1982

Related U.S. Application Data

[63] Continuation of Ser. No. 275,257, Jun. 19, 1981, Pat. No. 4,433,345.

[51] Int. Cl.³ .............................................. H04N 5/84
[52] U.S. Cl. .................................... 358/244; 358/345
[58] Field of Search ............... 358/168, 169, 244, 345, 358/348, 244.2; 346/110 R; 355/20; 369/124, 125

[56] References Cited

U.S. PATENT DOCUMENTS

| | | | |
|---|---|---|---|
| 3,177,764 | 4/1965 | Akima | 355/20 |
| 3,400,632 | 9/1968 | Wahli | 355/20 |
| 3,471,740 | 10/1969 | Dreyfoos | 358/168 |
| 3,700,329 | 10/1972 | Mason | 355/20 |
| 4,005,262 | 1/1977 | Fijisawa | 358/168 |
| 4,344,699 | 8/1982 | McIntosh | 335/20 |

FOREIGN PATENT DOCUMENTS 1585063   2/1981   United Kingdom ............... 358/168

Primary Examiner—Alan Faber
Attorney, Agent, or Firm—Pollock, Vande Sande & Priddy

[57] ABSTRACT

Apparatus and method are provided for controlling the brightness and brightness range of a CRT produced image. The resolution of photographs of the CRT-formed images is improved by establishing the absolute brightness and brightness range of the image to be reproduced within the brightness acceptance range of the photographic material used to record the images. Light sensing and measurement of the CRT image permits the establishment of a suitable image brightness and brightness range when representative samples of the video signal are supplied to the monitor CRT of the camera.

10 Claims, 6 Drawing Figures

APPARATUS FOR MAINTAINING OF A CATHODE RAY TUBE IMAGE WITHIN THE LIGHT ACCEPTANCE RANGE OF A PHOTOGRAPHIC FILM

RELATED APPLICATIONS

This application is a continuing application of Ser. No. 275,257, filed June 19, 1981, now U.S. Pat. No. 4,433,345 and assigned to the assignee of this application.

BACKGROUND OF THE INVENTION

The present invention relates particularly to the medical imaging art. Specifically, apparatus and method for maintaining the contrast range of a video monitor display within the brightness acceptance range of a photographic recording material are described.

Video imaging apparatus has been developed which permits, through the use of radiology or other techniques in conjunction with computer technology, a safe and accurate view of the interior of the human body. Among these techniques are computerized tomography (CT), positron emission tomography (PET), nuclear magnetic resonance (NMR) and diagnostic ultrasound examination.

All of these techniques depend upon a video display system for presenting the scanned image data to the diagnostician. Such display systems are ultimately resolution limited by imperfections in the phosphor screen of the cathode ray tube (CRT), by the minimum spot size achievable on the video monitor and, in some circumstances, by bandwidth limitations within the beam control circuits.

Additional limitations of CRT display devices are the change in brightness level and/or overall image contrast range which can occur over a period of time. All of these deficiencies result in a loss of image detail when hard copies of the displayed images are produced through photographic techniques. Such hard copies are often needed to enable later diagnosis and comparison between images formed before and after a patient's medication and treatment.

Camera systems for making permanent copies of video monitor images are described in U.S. Pat. Nos. 4,027,315 and 4,240,729, both assigned to the assignee of this application. Such camera systems provide for forming multiple images on a single sheet of photographic material. In accordance with the teachings of the aforementioned patents, the images from a CRT monitor are positioned at different locations on the sheet.

A drift in CRT image brightness can result in a loss of image detail as a result of under or over exposure of the photographic film. In order to preserve the maximum resolution of the system, the absolute brightness and brightness range of the CRT image is advantageously limited in order to avoid exposure errors on the film. Stabilizing the maximum image brightness level at a point just below the shoulder of the film density versus exposure characteristic avoids over exposing the film, with an attendant loss in image detail. A similar requirement exists for stabilizing the brightness of image details to be recorded above the toe region of the film density versus exposure characteristic, in order to maximize the overall resolution of the recorded image.

Of prime interest to a medical diagnostician is detail contained between each of these end points. By maintaining the end points at known brightness levels, detail between the end points is preserved. Any variation of detail within this range of interest raises substantial questions for the diagnostician as to whether a complete and accurate image is available upon which to provide a correct diagnosis. Local contrast in the area of interest is extremely important, and efforts to maintain the local contrast stable with time will ultimately enhance the confidence of the diagnostician in later produced images.

The portion of the density versus exposure characteristic lying between the toe and shoulder regions of a given photographic material, known to those skilled in the art as the brightness acceptance range of the photographic emulsion, should therefore be matched to the absolute brightness and contrast range of the CRT image, and maintained in that matched state over at least the period of time during which photographs of the images are being made. Further, it is desirable to match and maintain this relationship for any of the photographic materials used by those skilled in recording the video images which have different density versus exposure characteristics.

SUMMARY OF THE INVENTION

It is an object of this invention to provide control of the absolute brightness and brightness range of a CRT produced image.

It is a more specific object of the invention to provide apparatus for maintaining brightness characteristics of CRT-formed images produced in the medical imaging arts within the brightness acceptance range of photographic emulsions used to record the images.

These and other objects are achieved with apparatus and methods in accordance with the invention. A light detector is provided for monitoring the brightness of the recording CRT monitor in a medical imaging system. A sample of the video signal is taken at a known percentage of its maximum amplitude, preferably corresponding to a high brightness level. Means are provided for applying to the CRT monitor a fixed input voltage corresponding to the sampled level. Adjustment to the monitor image brightness level and control range are performed until the light detector indicates that the desired brightness levels are within the acceptance range of the photographic film to be used to record the images displayed on the CRT monitor. The invention provides for matching the recording CRT image to the brightness acceptance range of any selected photographic film having predetermined density versus exposure characteristics.

In a preferred embodiment of the invention, means are provided for sampling the amplitude excursion of the video signal at two levels: the first corresponding to a high level and the second corresponding to a low level. The sampled levels are applied as input signal to the video monitor. The monitor CRT image brightness level and contrast are adjusted under these input conditions to achieve an image brightness range, as measured and indicated by the light detector means, which produces known image densities corresponding to the video input within the acceptance range of the selected photographic material.

DESCRIPTION OF THE PREFERRED EMBODIMENT

Figure 1:
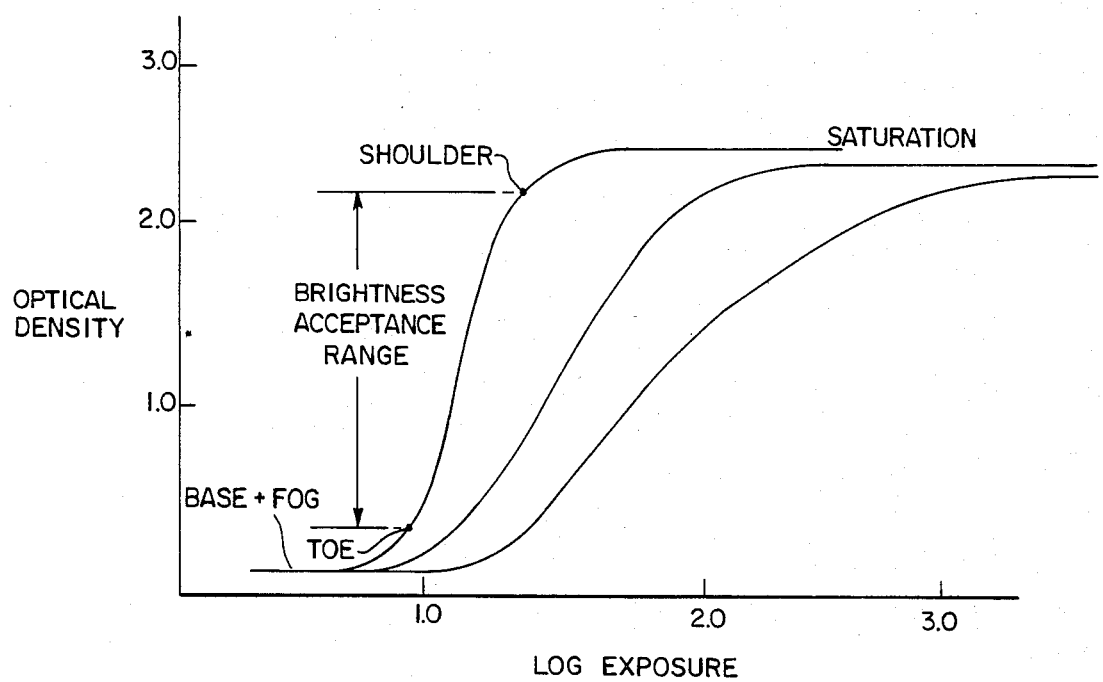
FIG. 1 illustrates the density versus exposure characteristics of three typical photographic emulsions used to record video display information.

Referring now to FIG. 1, there is shown the well known density versus exposure characteristic of several photographic emulsions used to record video display images in medical imaging systems. The density achieved in a photographic emulsion is related to the duration of exposure of the emulsion to the image brightness level, and to the subsequent degree of development of the exposed emulsion. The curves all show density saturation at the shoulder whereby after sufficient exposure, the emulsion is fully exposed and a further increase in exposure does not produce any corresponding change in image density. At the other extreme of the exposure characteristic curve, a certain minimum amount of light is required in order for the emulsion to exhibit only a slight increase in density from its absolute minimum value.

All photographic detail is recorded by exposing the emulsion to produce densities which are less than the emulsion saturation value, but greater than zero. This density range is identified by those skilled in the photographic art as extending from the "shoulder" portion of the emulsion curve, which is typically represented by an optical density of 2.3 maximum, to an optical density of 0.03 above base plus fog at the "toe" of the curve. To record on a photographic film all of the detail contained within the brightness of the image, the photographic emulsion must be exposed to produce density which lies between the shoulder and toe of the emulsion exposure curve.

Matching the density versus log exposure curve in the region between shoulder and toe with the brightness level and range of the image to be recorded avoids loss of detail due to emulsion saturation by over exposure, or through under exposure.

Figure 2:
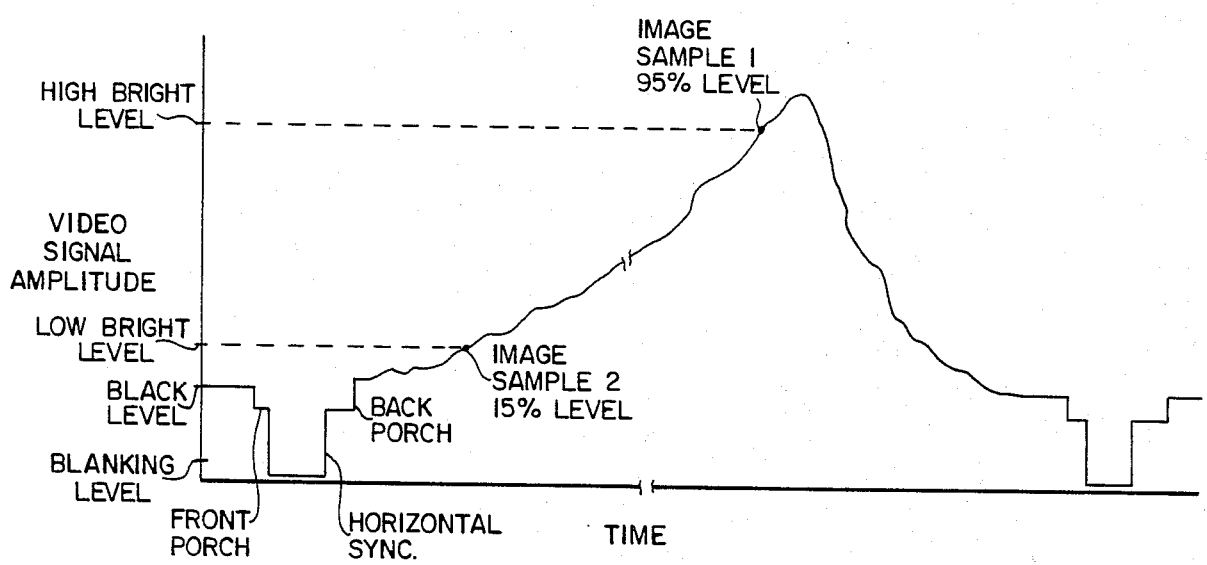
FIG. 2 demonstrates the amplitude range of the video input signal which produces brightness variations in the displayed video image.

In the video image projection art, the brightness of an image element formed on the CRT phosphor is related to the CRT beam current. This beam current level is, in turn, controlled by a video signal, as shown in FIG. 2. Referring to FIG. 2, the beginning portion of the video drive signal represents the horizontal synchronization signal. During this portion of the picture information, the CRT beam is cut off, preventing light emission from the phosphor screen. Following the horizontal synchronization period, the brightness level of the single scan line is shown as rising from a gray level to a peak high brightness and thence declines again to the black level.

In order to maintain the brightness and brightness range produced by the CRT image within the acceptance range of the photographic emulsion of FIG. 1, the CRT display must have brightness controls which establish absolute brightness and brightness range signals within the acceptance range of the photographic emulsion of FIG. 1.

The video monitor in many medical imaging systems permits polarity inversion of the CRT image, whereby either a positive or negative image may be presented for photographing. In order to match the acceptance range of a photographic film, the video signal is sampled to determine the electrical value at 15% of the maximum video signal amplitude (LBL) and the electrical value at 95% of the maximum video signal amplitude (HBL). Video signal levels at these two sampled levels are applied to the video monitor. When a positive image is being photographed, the brightness control of the monitor is adjusted until the LBL (low brightness level) input condition produces an exposure for a given f stop of the camera, at substantially the shoulder of the emulsion exposure characteristic for the film in use. For a negative image, the brightness level for this monitor input condition is adjusted until the exposure of the film corresponds to the toe of the emulsion exposure characteristic.

Once the brightness level for this LBL input condition is set, the 95% sampled signal level, HBL, is applied to the video monitor input. The contrast of the display is adjusted until a high brightness level, HBL, is at a level for producing in the case of a positive image, an exposure at a density level corresponding to the toe region of the emulsion exposure characteristic. For a negative image, the contrast is adjusted until the image brightness is obtained which will produce an exposure at a density level corresponding to the shoulder region of the emulsion exposure characteristic.

This procedure for establishing an image brightness and brightness range corresponding to the exposure acceptance range of the chosen emulsion is carried out as follows.

Figure 3:
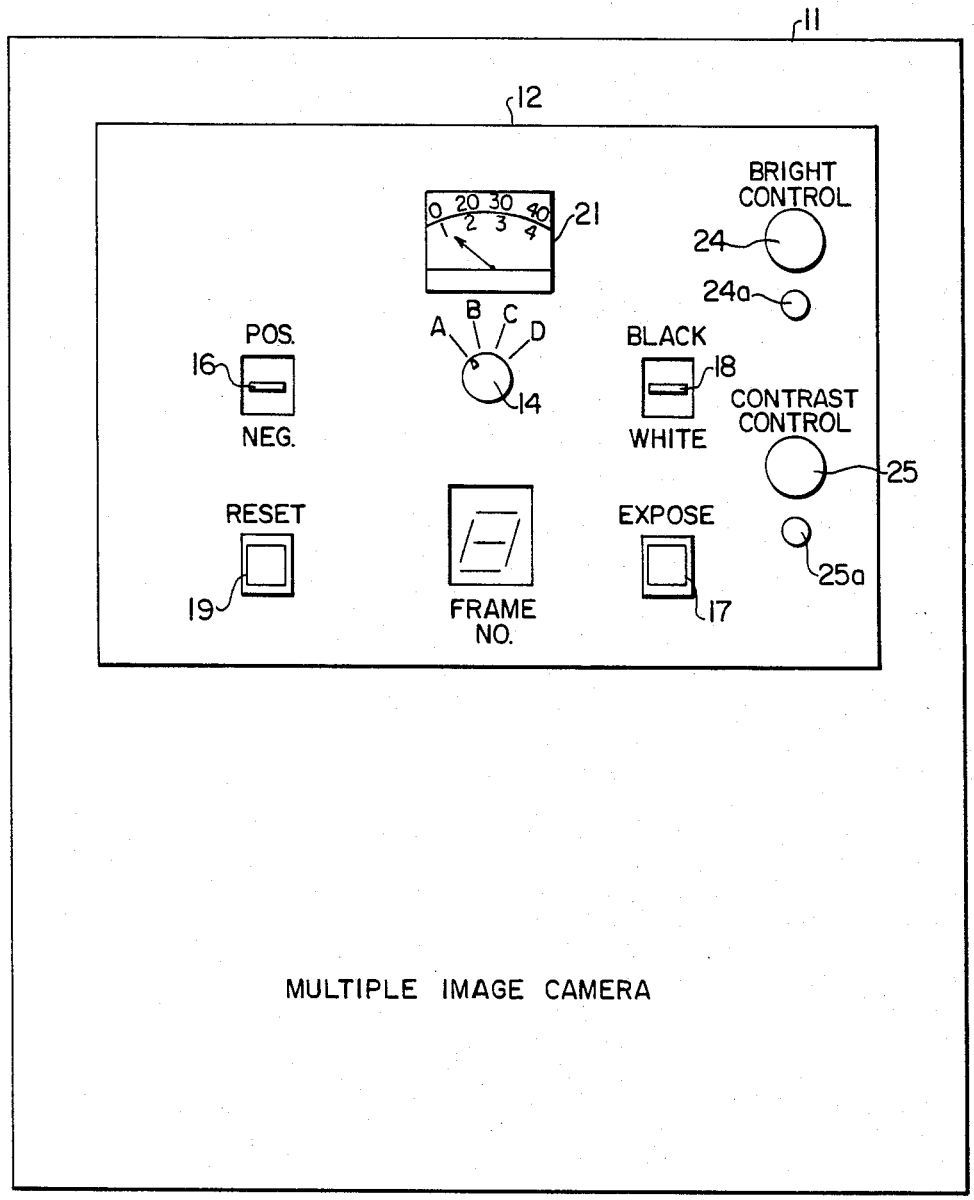
FIG. 3 demonstrates a multiple image camera having additional controls for matching the video signal excursion to the brightness acceptance range of a photographic emulsion.

Referring now to FIG. 3, there is shown a standard multiple image camera system, the conventional details of which are described more fully in U.S. Pat. Nos. 4,027,315 and 4,240,729, herein incorporated by reference. The control panel 12 of the multiple image camera includes additional controls not shown or described in the aforementioned patents. These controls include (1) a video select switch 14, (2) an intensity meter 21, (3) a polarity inversion switch 16, and (4) a BLACK/WHITE (B/W) switch 18.

One of four video signals available for rastered display on a monitor CRT internal to the multiple image camera 11 is selected with video select switch 14. If the image to be recorded is to be inverted, negative rather than positive polarity, switch 16 is moved accordingly. To calibrate the monitor CRT display to produce an image having an absolute brightness and brightness range within the acceptance range of a selected emulsion, an exposure value EV is selected from the exposure value selection table of Table I in accordance with the selected lens f stop and exposure time values set in the device, as follows:

TABLE I

| EXPOSURE VALUE SELECTION TABLE | | | | | |
|---|---|---|---|---|---|
| EV | f5.6 | f8 | f11 | f16 | f22 | f32 |
| 6 | ¼ sec. | 1 sec. | 2 sec. | — | — | — |
| 7 | ¼ sec. | ½ sec. | 1 sec. | 2 sec. | — | — |
| 8 | ⅛ sec. | ¼ sec. | ½ sec. | 1 sec. | 2 sec. | — |
| 9 | 1/15 sec. | ⅛ sec. | ¼ sec. | ½ sec. | 1 sec. | 2 sec. |

TABLE I-continued

| EXPOSURE VALUE SELECTION TABLE | | | | | | |
|---|---|---|---|---|---|---|
| EV | f5.6 | f8 | f11 | f16 | f22 | f32 |
| 10 | 1/30 sec. | 1/15 sec. | ⅛ sec. | ¼ sec. | ½ sec. | 1 sec. |
| 11 | — | 1/30 sec. | 1/15 sec. | ⅛ sec. | ¼ sec. | ½ sec. |

Next, from the intensity versus exposure characteristic curve of FIG. 1, the maximum desired density, close to the shoulder region of the curve, is selected. From this maximum density level and the film types disclosed in Table II (the Dunn Density Index Table) the maximum and minimum brightness levels corresponding to the end points of the acceptance range of the photographic film may be determined from Table II. The meter 21 has been conveniently calibrated to provide the readings of Table II when the desired brightness level under LBL and HBL input conditions are detected. The Dunn Density Index TM is more completely described in the aforementioned co-pending patent application. Other scales which are capable of defining the desired brightness levels for the required minimum and maximum density levels may be employed by those skilled in the art.

Meter 21, located on control panel 12, includes two scales. The upper scale indicates the maximum brightness level produced by the video image, and the lower scale displays the minimum brightness level produced by the video image under HBL and LBL input conditions.

To adjust the displayed image to have a brightness range between these levels, it is necessary to insert a video signal having amplitudes corresponding to the aforesaid 95% and 15% levels. By selecting the BLACK position with momentarily actuated switch 18, a video signal is fed to the monitor having either the aforesaid 95% amplitude level (HBL) or 15% amplitude level (LBL), depending on whether a positive or negative image is to be photographed. When the BLACK position is selected, and the image polarity switch 16 is positive, an LBL signal is applied to the monitor. Meter 21, which is advantageously connected to a photodetector measuring the brightness of the CRT image, indicates the absolute brightness level produced at this selected video signal amplitude. Brightness control 24 is then adjusted to duplicate the second, higher reading derived from Table II, corresponding to the shoulder of the exposure characteristic in the case of a positive CRT image.

TABLE II

| DUNN DENSITY INDEX TABLE | | | | | | |
|---|---|---|---|---|---|---|
| Maximum Density | MRF 31 | NMB/ NMC | Ortho-M | MR-1 | GTA | FUJI-US |
| Exposure Value 6 | | | | | | |
| 2.0 | — | .2/4.0 | — | .2/7.0 | 1/4.0 | — |
| 1.8 | — | — | — | .2/5.6 | .1/3.5 | .1/5.2 |
| 1.6 | — | — | — | .2/4.0 | — | — |
| Exposure Value 7 | | | | | | |
| 2.0 | .3/5.5 | .4/7.8 | .6/5.2 | .5/13.8 | .2/9.0 | — |
| 1.8 | .3/4.5 | .4/6.8 | .6/4.5 | .5/11.2 | .2/7.0 | .1/10.5 |
| 1.6 | .3/3.5 | .4/5.8 | .6/3.8 | .5/9.0 | .2/5.2 | .1/6.0 |
| Exposure Value 8 | | | | | | |
| 2.0 | .6/11 | .9/15.5 | 1.2/10.5 | 1.0/27.5 | .5/18 | — |
| 1.8 | .6/9 | .9/13.8 | 1.2/9 | 1.0/22.5 | .5/14 | .3/21 |
| 1.6 | .6/7 | .9/11.5 | 1.2/7.5 | 1.0/18 | .5/10.5 | .3/12 |
| Exposure Value 9 | | | | | | |
| 2.0 | 1.2/22 | 1.8/31 | 2.4/21 | 2.0/55 | 1.0/36 | — |
| 1.8 | 1.2/18 | 1.8/27.5 | 2.4/18 | 2.0/45 | 1.0/28 | .6/42 |
| 1.6 | 1.2/14 | 1.8/23 | 2.4/15 | 2.0/36 | 1.0/21 | .6/24 |
| Exposure Value 10 | | | | | | |
| 2.0 | 2.4/44 | 3.6/62 | 4.8/42 | — | 2.0/72 | — |
| 1.8 | 2.4/36 | 3.6/55 | 4.8/36 | 4.0/90 | 2.0/56 | 1.2/84 |
| 1.6 | 2.4/28 | 3.6/46 | 4.8/30 | 4.0/72 | 2.0/42 | 1.2/48 |
| Exposure Value 11 | | | | | | |
| 2.0 | 4.8/88 | — | 9.6/84 | — | — | — |
| 1.8 | 4.8/72 | — | 9.6/72 | — | — | — |
| 1.6 | 4.8/56 | 6.0/94 | 9.6/60 | — | 4.0/84 | 2.4/96 |

Thus, for an exposure value of 8 and a maximum density of 1.8, and using film type MR-1 which is known to those skilled in the art, a reading of 22.5 is required for a positive image photograph corresponding to the shoulder of the emulsion acceptance range. Thus, brightness control 24 is adjusted to achieve a meter indication of 22.5. With a negative CRT image, and switch 18 in the BLACK position, the contrast control is adjusted to achieve the meter indication of 22.5 corresponding to the HBL input condition.

With one end of the video image brightness range having been set, switch 18 is set to its WHITE position. This places on the monitor CRT video input a signal having an amplitude at the aforesaid 95% or 15% level depending on the CRT image polarity. With the display monitor internal to multiple image camera 11 producing an image having this constant image brightness, contrast control 25 is adjusted, in the case of a positive CRT image, where an HBL input signal is now applied to monitor input until, in accordance with Table II, a reading of 1.0 is obtained when film type MR-1 is selected. Of course, in the case of the negative CRT image, an LBL signal is applied to the video monitor and brightness control 24 is so adjusted to achieve the lower reading of 1.0.

In order to avoid any confusion as to which control, brightness 24 or contrast 25 is to be operated, indicators 24a and 25a tell the operator, for the image polarity selected which control is to be adjusted under a selected BLACK and WHITE video signal input condition selected by switch 18.

With the monitor image absolute brightness and brightness range thus set, recordings of images produced on the screen of monitor CRT 38 taken on film having the aforesaid MR-1 designation, will produce photographs having densities lying between the toe and shoulder regions of the respective density versus exposure curve after processing. Thus, detail which would otherwise be lost due to under or over exposure of the emulsion is preserved and the first picture attempted is in calibration.

Figure 4:
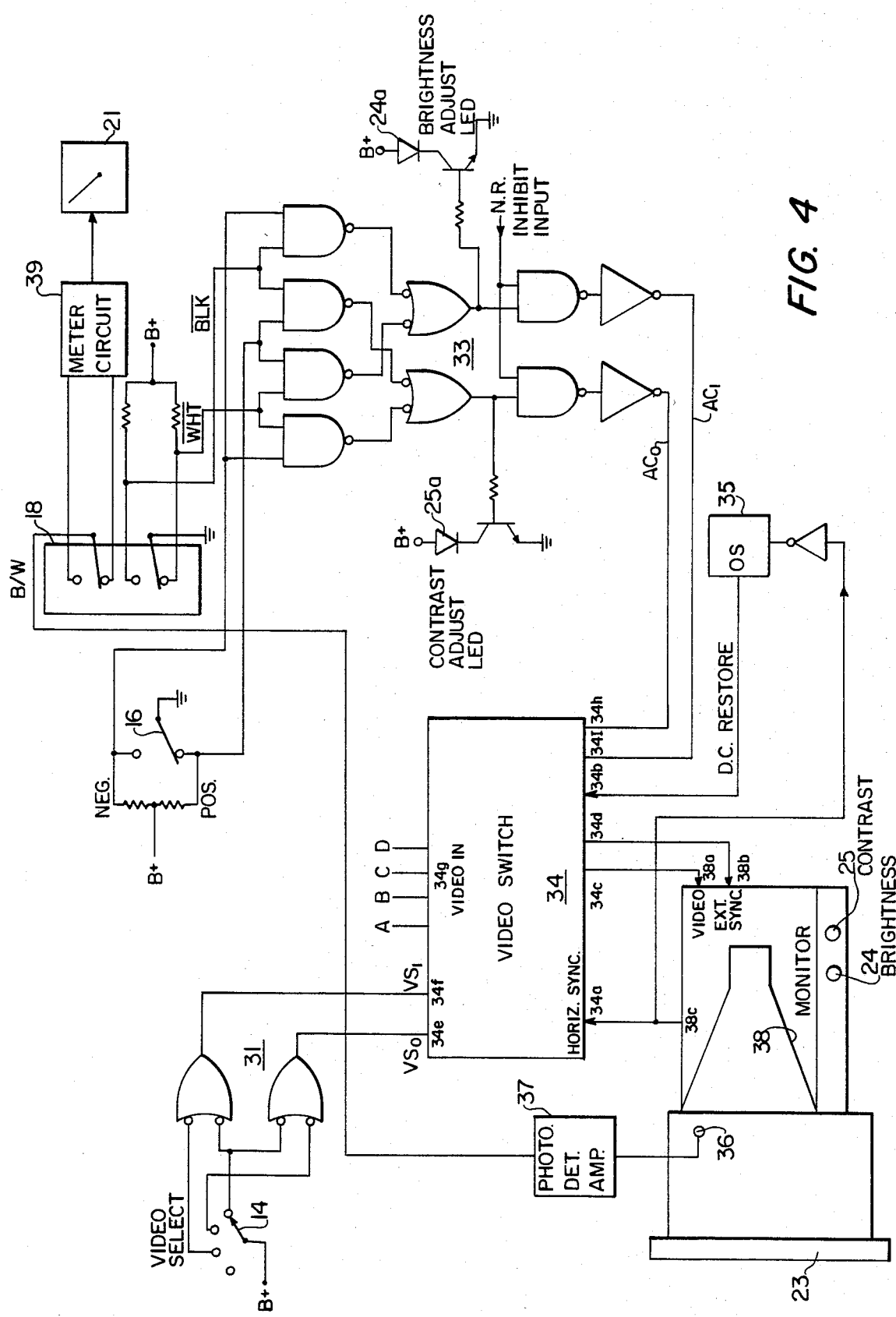
FIG. 4 demonstrates the additional circuitry required to implement the additional functions for controlling image density with respect to a photographic emulsion brightness acceptance characteristics in the multiple image camera.

The circuitry for implementing the controls of control panel 12 for effecting brightness calibration of the displayed image is shown in FIG. 4. Referring now to FIG. 4, a video select switch 14 is shown which selects one of four input signals to monitor CRT 38. The actual video input signals A, B, C and D are applied through connectors 34g to a video switch 34. Video switch 34 contains therein a multiplexer which, in accordance with the code $VS_1$, $VS_0$ applied to terminals 34e and 34f, selects one of the four video signals for display. Steering logic 31 provides, in response to the positioning of video switch 14, a two bit binary code for selecting the video signal. The monitor 38 is conventional and may be of the type described in the aforesaid U.S. patents. Monitor 38 includes a brightness control 24 and a contrast control 25 as well as a video signal input 38a and external synchronization input 38b. As is known to those skilled in the art, the monitor scanning sequence may be synchronized with the incoming video signals, or with another periodic signal applied to the external synchronization input 38b.

A horizontal synchronization output 38c is also provided by monitor 38 which supplies the internally generated sync pulse starting each scanned line of video image.

Video switch 34 receives two additional inputs $AC_0$ and $AC_1$, on terminals 34h and 34i. These terminals will select the HIGH or LOW video signal level used to establish the HIGH and LOW brightness level of the image during the calibration procedure.

B/W calibration switch 18 applies, in one of the selected positions, a $\overline{WHT}$ or $\overline{BLK}$ signal for selecting the aforesaid high and low levels of video signal. Steering logic 33, depending upon the position of switches 18 and 16 selects either the high (HBL) or low (LBL) level video signal condition for obtaining the brightness level of interest. An inhibit input NR (NOT READY) is also available which inhibits the calibration procedure if the camera is in picture-taking condition. Camera logic indicating the shutter is open, or that an exposure is being made such that displaying the HBL or LBL signals would expose the film, is used to produce the NR inhibit signal.

Photodetector amplifier 37 is connected to photodetector 36, arranged to view the CRT monitor display. The brightness level thus seen is amplified in photodetector amplifier 37, and the signal level received therefrom is applied via one pole of switch 18 to an appropriate input of meter circuit 39. Meter circuit 39 requires two inputs, one to provide the appropriate meter deflection when the higher brightness level is being monitored, and the other to provide the appropriate meter deflection when the lower level of brightness is being monitored. Switch 16 controls the video image signal polarity through additional contacts not shown, connected to the monitor in a known manner and permits the display to be calibrated with whichever polarity image is to be recorded through the contacts shown.

The control which is to be adjusted for a given signal polarity, and position of BLACK/WHITE switch 18, is indicated by indicator 25a and 24a. The indicators may be standard LEDs driven by an appropriate transistor. Thus, the operator need not keep track of which control requires adjustment under different video signal polarity conditions.

One shot circuit 35 provides a DC restoration pulse, which may typically be of one microsecond duration, to input 34b of the video switch in response to each horizontal synchronization pulse. This pulse is used during selection of the brightness calibration signals in a manner to be explained in connection with FIG. 5.

Figure 5:
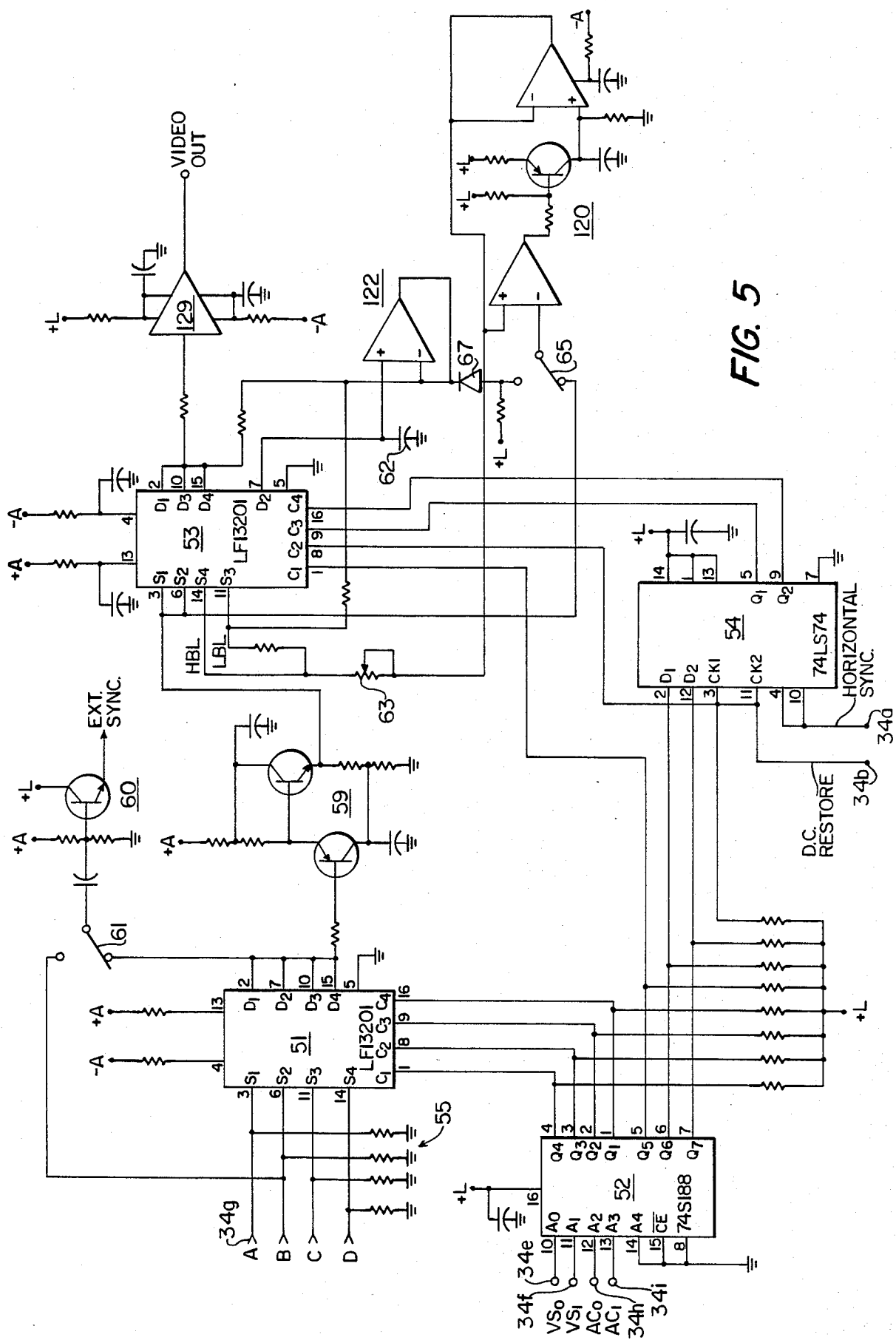
FIG. 5 demonstrates circuitry for implementing the video switch of FIG. 4.

Referring now to FIG. 5, details of the video switch 34, which permits the selection of the two brightness levels of interest for display on monitor 38 are shown. The video switch provides selection of one of the four inputs, A, B, C or D, as well as selecting two values of brightness, one being the maximum intensity which is to be displayed on the monitor CRT to achieve a given high density exposure for a given exposure time (HBL), and the other being the minimum brightness level (LBL) for the same exposure time to achieve a given lower density above base plus fog.

Referring to FIG. 5, there is shown an analog multiplexer 51 which receives, on inputs S1, S2, S3 and S4, four video signal lines, any one of which may be selected. The selection inputs S1, S2, S3 and S4 include parallel connected resistor networks 55. Resistor networks 55 are provided to achieve the correct input impedances, thereby permitting proper termination of the cables supplying the video signals.

The designations +A, −A and L are standard power supply connections to appropriate DC voltage levels for supplying operating current to the components of FIG. 5.

Control of analog multiplexer 51 is provided by decoder 52. Decoder 52, in response to the logic state of inputs $A_0$ and $A_1$, which correspond to $VS_0$ and $VS_1$ on terminals 34h and 34f, provides one of four decided outputs Q1 through Q4. These outputs enable one of S1, S2, S3 or S4 to be connected to output D1, D2, D3 and D4. The analog multiplexer 51 is type LF 13201 and the decoder 52 is a PROM type 74S188, known to those skilled in the art.

An amplifier 59 receives the common outputs D1, D2, D3 and D4 and provides an output signal at a level suitable for further signal processing. A sync separator 60 also receives the signal from D1, D2, D3, D4 when switch 61 is appropriately positioned. The sync separator 60 provides an external synchronization signal to the camera CRT monitor for maintaining the scanning beam synchronized with the selected incoming video signal format. Switch 61, when thrown to its alternate position, permits synchronization signals to be derived from one of the input video signals, while another video signal is selected and applied to terminals D1, D2, D3 and D4 for further processing.

The selected video signal from amplifier 59 is applied to input S1 of multiplexer circuit 53 which is type LF 13201 which also receives inputs from decoder 54, which is type 74LS84. Decoder 54 receives a horizontal sync pulse on line 34a which sets flip flops within decoder 54 to have a state wherein Q1 and Q2 are 0. Thus set, back porch sampling may commence whereby sample circuit 122 stores the video signal back porch level on capacitor 62. The DC RESTORE pulse of 1μ second from one shot 36 of FIG. 4 is initiated by each horizontal sync pulse and enables C2 of multiplexer circuit 53. The coincidence of the DC RESTORE pulse on line 34b, and Q1 and Q2 at zero logic level, permits sample circuit 122 to receive the video signal on S1.

The trailing edge of the DC RESTORE pulse applies a zero logic level to C2 isolating capacitor 62 from the remaining portion of the video signal, and it also clocks decoder 54 to restore Q1 and Q2 to their original condition.

A peak detector 120 is connected via one contact of switch 65 to continuously sample the peak level of the video signal. Potentiometer 63 provides control over the HBL level to obtain the desired 95% of maximum electrical value. Switch 65 also provides an optional peak level which is the backporch level plus the voltage drop across diode 67.

With the LBL and HBL levels thus established on inputs S3, S4, either LBL, HBL or video signal from amplifier 59 may be selected to be applied to amplifier 129. During the time switch 18 is operated, $AC_0$ and $AC_1$ will provide a logic state, depending on the position of the polarity inversion switch 16 which will select either HBL or LBL for output to amplifier 129. If HBL is required $AC_0$ is asserted and through PROM 54 $AC_0$ selects Q6 which is gated to C4 of 53. If LBL is required $AC_1$ is asserted to select C3 of 53. When switch 18 is not operated Q5 of decoder 52 enables multiplexer circuit 53 to provide the video signal to amplifier 129.

Thus, there has been described with respect to FIG. 5 a video switch which is capable of performing the functions of video switch 34 shown in FIG. 4.

Figure 6:
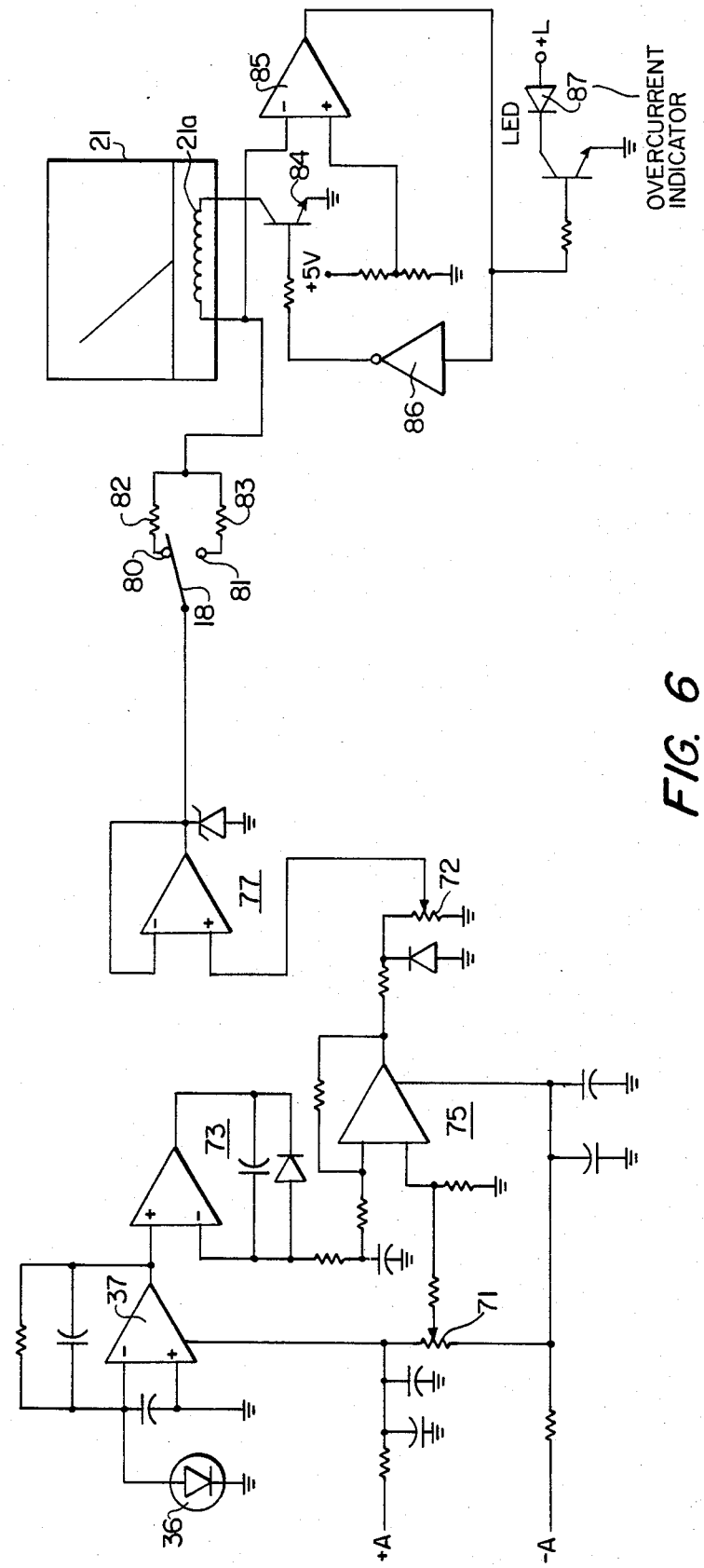
FIG. 6 is illustrative of circuitry for providing the photodetector amplifier of FIG. 4 and meter circuit.

Finally, the meter circuit for monitoring the brightness levels produced under the sampled high and low level video signal input conditions is shown in FIG. 6. The left half portion of the Figure demonstrates the photometer 52 connection and amplifier and detector arrangement. The right half of the Figure shows the metering circuit connected thereto to provide for different deflections of meter 21 in response to the closure of switch 18 to the HIGH or LOW brightness level detection condition.

The photodetector and amplifier comprise an input amplifier 37 connected in the inverting mode with feedback resistor and capacitor for amplifying the output of photodetector 36. Two calibration potentiometers 71, 72 are provided which, with the aid of the light monitor, provide appropriate deflection of meter 21 in response to known input light conditions to photodetector 36. An integrator with clamping 73 follows the amplification stage. The integrated output from the light detector is applied as an input to differential amplifier 75. Differential amplifier 75 receives as an offset voltage the selected voltage from potentiometer 71 which cooperates in the calibration process.

The output of differential amplifier 75 is applied to potentiometer 72 having a wiper arm thereof connected to upper amplifier 77.

The meter circuit deriving appropriate deflection indications in response to the incident light, comprises two inputs 80, 81 which are selectively connected to the photodetector through scaling resistors 82 and 83 by switch 18. The meter movement winding 40a receives the current from resistors 82 and 83 and the circuit for meter winding 40a is completed through transistor 84. Transistor 84 forms a portion of a meter protection circuit which includes a differential comparator 85 and inverter 86. In the event that the potential across the meter winding becomes excessive, the differential amplifier 85 will open transistor 84 to protect meter movement 40 against excessive current. Also shown is illumination for the meter provided by a red LED 87 operated from the meter protection circuit. In the event the current through the meter is sensed as excessive, the red light behind the meter will illuminate, warning the operator of the problem.

Photodetector amplifier 37 and metering circuit 39 receive the sensed light level and produce an indication thereof for monitoring any time the operator of the device wishes to make certain that the image brightness is within the acceptance range of the photographic film being used. The monitoring operation can be done periodically during use of the instrument, and when film types are changed it is easily capable of being readjusted such that the brightness level and range produced on the CRT display lies within the acceptance range of the new film.

Thus, there has been described with respect to one embodiment, apparatus for conveniently monitoring the brightness level of images produced in medical imaging systems. Those skilled in the art will recognize yet other embodiments described more particularly by the claims which follow.

What is claimed is:

1. In a system for photographing images displayed on a cathode ray tube monitor, apparatus for maintaining the image brightness parameters within the acceptance range of the photographic emulsion used for recording said images comprising:

means for visually monitoring the brightness level produced by an image generated by said cathode ray tube;

means for continuously sampling a video signal to be displayed on said cathode ray tube at first and second percentages of said video signal amplitude excursion;

means for applying first and second video signals luminance levels to said monitor for producing first and second brightness levels, said luminance levels corresponding to said first and second sampled amplitude levels of said video signal to be displayed;

means connected to said monitor for adjusting the brightness level of said CRT-produced image until said means for monitoring indicates a first desired brightness level is being produced when a first of said video signal levels is applied to said monitor; and means connected to said monitor for adjusting the contrast of said CRT-produced image until said means for monitoring indicates a second desired brightness is being produced in response to said second video luminance level, whereby subsequent video signals having luminance levels corresponding to said first and second luminance levels will produce images having said desired brightness.

2. In a system for recording on a photographic emulsion an image from a cathode ray tube monitor, apparatus for adjusting the brightness level of said image to match the brightness range of said emulsion comprising:

a light responsive transducer connected to sense the brightness of said image;

a video switch for selectively applying one of a plurality of video signals to said cathode ray tube monitor video input, said switch including means for continuously sampling a selected video signal at first and second levels corresponding to first and second percentages of said video signal amplitude excursions;

means to individually apply said first and second sampled levels of video signal to said cathode ray tube monitor whereby corresponding first and second image brightness levels are produced;

means for making first and second comparisons between said first and second brightness levels and first and second reference brightness levels which lie within the brightness acceptance range of said photographic emulsion;

manual brightness adjustment means connected to adjust the brightness level of said cathode ray tube monitor until said first comparison indicates said levels are equal; and manual contrast adjustment means for adjusting the contrast of said CRT monitor until said second comparison indicates said second levels are equal, whereby subsequent video signal levels between said percentages produce an image having brightness levels within said photographic emulsion brightness acceptance range.

3. The apparatus of claim 2 further comprising:
   means for indicating the polarity of an image to be displayed on said cathode ray tube monitor;
   logic means connected to said means for selecting the polarity of said image, and to said means to individually apply said first and second sampled levels of video signal to said cathode ray tube monitor; and
   indicator means connected to said logic means for indicating which of said adjustment means is to be operated.

4. The apparatus of claim 3 wherein said logic means selects which of said first and second sampled levels is to be applied to said monitor in accordance with the selected polarity of an image.

5. The apparatus of claim 3 wherein said indicator means comprises first and second light indicators located adjacent said manual brightness and manual contrast adjustment means.

6. In a system for photographing an image produced on a cathode ray tube monitor in response to a video signal, a method for matching the image brightness range with the acceptance range of a photographic film comprising:
   continuously sampling said video signal at first and second levels of its amplitude excursion, said levels representing first and second amplitude limits of excursion for said video signal;
   applying to said monitor a video signal level equal to said first level;
   monitoring the brightness produced by said cathode ray tube in response to said first level;
   manually adjusting the brightness level of said monitor until a level is obtained which produces a first desired density within said acceptance range;
   applying to said monitor a video signal corresponding to said second sampled level;
   monitoring the brightness produced by said cathode ray tube in response to said video signal; and
   manually adjusting the contrast of said monitor until a brightness level which produces a second desired density within said acceptance range is obtained whereby, for amplitude excursions of a subsequent video signal said monitor produces an exposure of said photographic film within said acceptance range.

7. In a system for photographing cathode ray tube monitor-produced images, said monitor including manual brightness and contrast controls, and wherein a photographic film having an acceptance range defined by two density limits is used to record said image, an apparatus for adjusting said image brightness to produce an exposure of said film within said acceptance range comprising:
   means for continuously sampling a video signal to be displayed by said monitor at first and second levels which produce a high brightness and a low brightness level;
   means for applying a first video signal of said first sampled level to said monitor and a subsequent video signal representing said second sampled level to said monitor;
   means for measuring the brightness produced by said cathode ray tube in response to said applied video signals;
   manual means for adjusting the brightness of said monitor when said first video signal is applied until a brightness is produced which produces a density on said film substantially the same as one of said two limits; and
   manual means for adjusting the contrast of said monitor image when said subsequent video signal is applied, to produce a brightness which produces a density on said film substantially the same as the remaining of said two limits.

8. In a system for photographing cathode ray tube monitor produced images, said monitor including manual brightness and manual contrast controls, and wherein a photographic film having an acceptance range defined by two density limits is used to record said image, apparatus for matching said image brightness with said acceptance range comprising:
   means for supplying a video signal to be displayed to said monitor;
   means for continuously sampling said video signal at first and second levels corresponding to first and second percentages of said video signal amplitude excursion;
   means for applying a first video signal level corresponding to said first sampled level, and a second video signal corresponding to said second sampled level to said monitor;
   means for comparing the brightness level produced by said cathode ray tube in response to each of said applied video signals with first and second desired brightness levels whereby one of said brightness and contrast controls is adjusted to obtain a desired cathode ray tube brightness for one of the applied levels, and the remaining of the controls is adjusted to obtain a cathode ray tube brightness for the remaining one of said applied levels.

9. In a system for photographing images produced by a cathode ray tube monitor, said monitor producing either a positive or negative selected image, apparatus for matching said image brightness to an photographic emulsion acceptance range comprising:
   means for continuously sampling a video signal supplied to said monitor at first and second percentages of the amplitude excursion of said signal;
   means for indicating whether the polarity of said video signal produces a positive or negative selected image;
   means for supplying first and second video signals representing said first and second sampled levels to said monitor whereby first and second brightness levels are produced;
   means for measuring the brightness level produced by said first and second video signals;
   means for adjusting the contrast of said image in response to said first video signal when said means for indicating indicates the polarity of said video signal produces a negative image to achieve a first desired brightness level; and
   means for adjusting said monitor brightness produced in response to said second video signal to achieve a second desired brightness level, said first and second desired brightness levels producing a known density within said photographic emulsion acceptance range.

10. In a system for recording cathode ray tube monitor produced images, said monitor including manual brightness and contrast controls, and wherein a photographic film having an acceptance range defined by two density limits is used to record said image, apparatus for matching said image brightness with said acceptance range comprising:

means for supplying a video signal to be displayed to said monitor;

means for continuously sampling said video at first and second levels corresponding to first and second percentages of said video signal amplitude excursion;

means for indicating the polarity of an image to be recorded;

logic means connected to said means for indicating a polarity;

means for applying in sequence a signal corresponding to said first level and a signal corresponding to said second level to said monitor, said means for applying being connected to said logic means, whereby the sequence for applying said first and second level signals is controlled;

indicator means connected to said logic means for indicating whether a contrast or brightness adjustment is to be effected;

means connected to said monitor for measuring the brightness of said cathode ray tube in response to said signals applied in sequence;

manual means for adjusting the brightness level of said monitor to a predetermined level in response to one of said applied sequential signals corresponding to one of said first or second levels; and manual means for adjusting the contrast of said monitor to achieve a desired brightness level when the other of said applied sequential signals corresponding to the other of said first and second levels is applied, said manual brightness and contrast means being selected for adjustment in accordance with said indicator means to achieve a light output for said monitor cathode ray tube which lies within said acceptance range for any image polarity.

* * * * *